United States Patent [19]

Wilk

[11] 3,789,774
[45] Feb. 5, 1974

[54] TRANSPORT VEHICLE FOR LONG LOADS HAVING LIMITED LATERAL ROADWAY CLEARANCE

[75] Inventor: Stanley H. Wilk, Dalton, Mass.

[73] Assignee: General Electric Company

[22] Filed: May 8, 1972

[21] Appl. No.: 251,154

[52] U.S. Cl. .............................................. 105/367
[51] Int. Cl. .............................................. B61d 3/16
[58] Field of Search ..................................... 105/367

[56] References Cited
UNITED STATES PATENTS
3,147,715  9/1964  Myers ................................. 105/367
3,242,879  3/1966  Bronlund ........................... 105/367
3,648,622  3/1972  Lich ................................... 105/367
FOREIGN PATENTS OR APPLICATIONS
1,180,391  10/1964  Germany ........................... 105/367

Primary Examiner—Drayton E. Hoffman
Attorney, Agent, or Firm—John J. Kelleher; Francis X. Doyle

[57] ABSTRACT

In a transport vehicle including a swiveled wheel truck, a flat bearing plate between the bolster platform of the truck and a bed plate of the vehicle frame provides two longitudinally spaced swivel pins, one between the bearing plate and the truck and the other between the bearing plate and the vehicle frame. Selectable locking means between the bearing plate and truck and between the bearing plate and vehicle frame provide means for preventing swiveling movement about either swivel pin while enabling swiveling movement about the other. By this means longitudinal spacing between swivel pins at opposite ends of the vehicle may be adjusted to reduce lateral displacement of the vehicle midpoint on curved sections of roadway.

4 Claims, 2 Drawing Figures

PATENTED FEB 5 1974  3,789,774
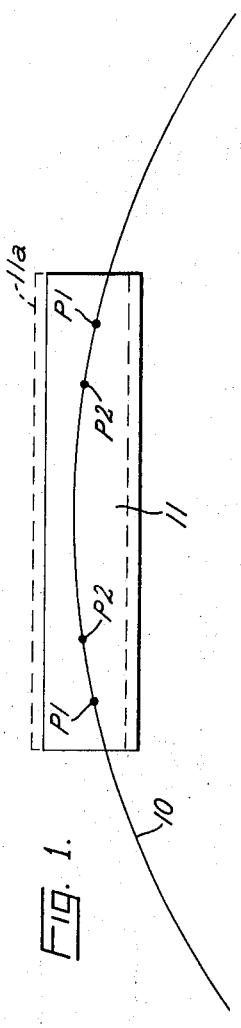
Fig. 1.
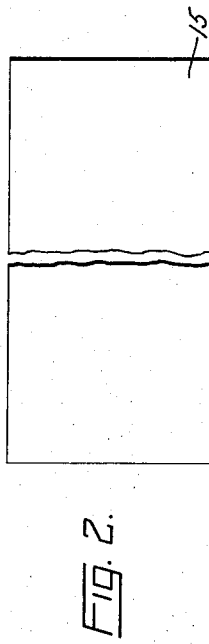
Fig. 2.
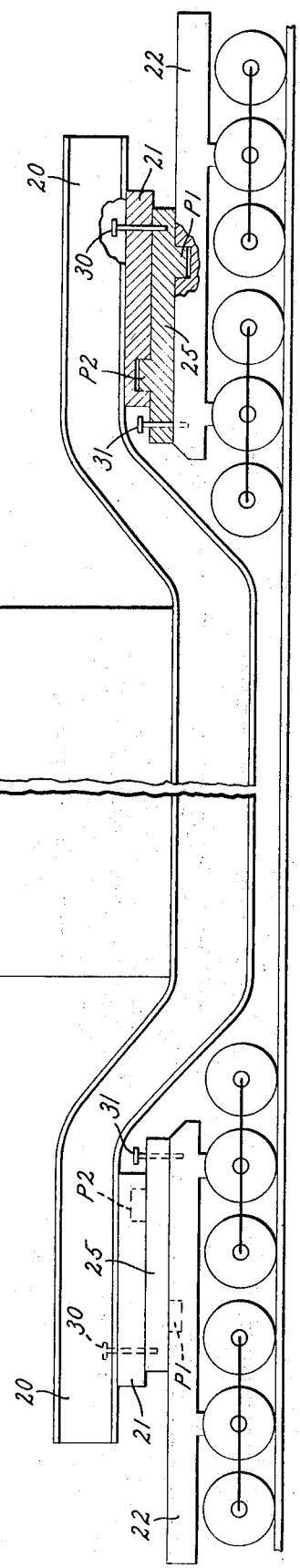

TRANSPORT VEHICLE FOR LONG LOADS HAVING LIMITED LATERAL ROADWAY CLEARANCE

My invention relates to transport vehicles for long wide loads, and particularly to rail cars for transport of large electric power apparatus on roadways having limited lateral clearance on curves.

The following art, which appears to be prior to applicant's invention and may be regarded as relevant, has been specifically considered by applicant:

U.S. No. 3,242,879 – Bronlund
U.S. Pat. No. 3,147,715 – Myers
U.S. Pat. No. 3,143,082 – Austgen In the design of large electric power transformers and the like the trend for many years has been to increase the kva rating of single units and as a consequence to increase the physical size of the apparatus both in weight and dimension. All three dimensions present problems in transport by rail or roadway where a transformer tank must clear overhead and lateral obstacles. This is particularly true in rail transport where length and width of a load are limited by track curvature and clearance between fixed objects. While length alone is not a severe limitation a very long load creates a lateral clearance problem on curves due to lateral displacement at the center of the load. If lateral displacement of the load on curves can be reduced, longer and/or wider loads may be accommodated. If, on the other hand lateral displacement is not a problem, as on sharp curves in switchyards or on curves of large radius, it is desirable in the interest of stability to have optional means available for operating the vehicle in a normal manner and without a reduction of usual lateral displacement.

Accordingly it is a principal object of my invention to provide a transport vehicle for long loads having improved means for reducing lateral displacement of the load from the roadway center line on curves.

It is a further object of my invention to provide a long swivel truck transport vehicle having improved means for selectably reducing longitudinal distance between swivel pins of spaced apart trucks.

It is a more particular object of my invention to provide a swivel truck for rail or road vehicles which provides two longitudinally spaced pivot pins and improved means for selectively rendering either one or the other pin operable as king pin between the vehicle and the truck.

In carrying out my invention in one preferred embodiment I provide a vehicle having a frame supported at each end upon a wheeled bogie truck and a pair of alternate swivel pins between each truck and the vehicle frame. Between a bolster platform on each truck and the vehicle frame I provide a flat horizontal bearing plate having a pivotal connection to the vehicle frame at one point and a pivotal connection to the truck platform at a longitudinally spaced point. Removable locking pins are provided for selectively and alternatively locking the bearing plate either to the truck or to the vehicle frame while permitting the plate to swivel about its pin connection with the other part.

My invention will be more fully understood and its various objects and advantages further appreciated by referring now to the following detailed specification taken in conjunction with the accompanying drawing in which:

FIG. 1 is a schematic diagram of a long vehicle traversing a curved track or roadway and illustrating the effect of my invention in reducing lateral displacement at the vehicle midpoint; and FIG. 2 is a foreshortened side elevational view of a rail car designed for transport of long wide loads and including swiveled end trucks embodying my invention.

Referring now to the drawing I have illustrated at FIG. 1 a curved section of track or roadway, showing only the center line 10, and have indicated schematically a vehicle body 11 pivotally mounted at opposite ends at points P1 upon swiveled wheel trucks (not shown) in a manner well known to those skilled in the art. To illustrate the lateral positioning effect of pivotally mounting the vehicle body 11 at inwardly offset pivot points P2 I have illustrated in dotted lines 11a the position of the same vehicle body if mounted at the pivot points P2. It will be observed that by inwardly offsetting the pivot points upon which the vehicle body is mounted and thus bringing these points closer together the lateral displacement of the central portion of the vehicle body with respect to the center line of the roadway is diminished. By my invention each end of the vehicle body is provided with a pair of selectable pivot points, as the points P1 and P2 of FIG. 1, as will be more fully described hereinafter.

Referring now to FIG. 2 I have illustrated my invention embodied in a rail vehicle of the drop frame type especially designed for transport of large heavy loads such as an electric power transformer schematically illustrated at 15. The vehicle frame comprises a pair of parallel spaced apart sectional beams 20 (only one of which is shown) extending longitudinally of the vehicle and having upwardly offset end portions fixed to transverse frame bed plates 21. At each end the vehicle frame 20–21 is pivotally carried upon a multiple axial wheel truck including a flat horizontal bolster plate or platform 22. The frame bed plate 21 at each end rests upon the associated truck platform 22 and is pivotally connected thereto for swivel action about one of two longitudinally spaced vertical pivots in a manner to be described more fully hereinafter.

Between each frame bed plate 21 and the bolster platform 22 upon which it is carried I provide a flat pivotal bearing plate 25 which extends along the vehicle center line and provides spaced-apart pivot means. In each bearing plate 25 the outermost pivot is at approximately the longitudinal midpoint of the truck and the other pivot is inwardly offset along the center line toward the vehicle midpoint. In the illustrated embodiment the bearing plate 26 is provided on opposite upper and lower surfaces and along the center line of the vehicle with protruding vertical pivot pins or bosses P1 and P2 which correspond, respectively, to the pivot pins illustrated schematically at each end of the vehicle in FIG. 1. The vertical pivot pins P1 and P2, respectively, extend into cooperating recessed swivel bearings in the juxtaposed bolster platform 22 and frame bed plate 21. As illustrated at FIG. 2 the swivel pin P1 at the truck midpoint extends downwardly into a bearing recess in the bolster plate 22 and the swivel pin P1 extends upwardly into a recessed bearing in the frame bed plate 21. It will of course be understood by those skilled in the art that, if desired, the orientation of the pins P1 and P2 may be reversed so that the frame plate 21 swivels upon the pin P1 and the bolster platform 22 swivels upon pin P2.

In order to provide for selection of either P1 or P2 as an operable king pin between the wheel truck and the vehicle frame I provide locking means for preventing swivel action between the bearing plate 25 and either the bed plate 21 or bolster platform 22 (i.e., permitting swivel action about only a selected one of the pins P1 or P2).

Specifically I provide a locking pin 30 between the bearing plate 25 and the frame plate 21 at a point radially spaced from the pivot pin P2 therebetween and a similar locking pin 31 between the bearing plate 25 and the bolster platform 22 at a point radially spaced from the pin P1. As shown the locking pins are at longitudinally opposite ends of bearing plate 25 and each cooperates with the pivot pin at the other end to prevent swiveling movement about that pivot pin.

In operation either one or the other, but not both, of the locking pins 30–31 is placed in locking position. If for example the locking pin 31 is in place it prevents swiveling movement about pin P1 between the bearing plate 25 and the bolster platform 22. At the other end of the bearing plate 25 adjacent the swivel pin P1 the locking pin 30 will be withdrawn, so that relative swiveling movement is permitted between the bearing plate 25 and the frame plate 21 and about the pin P2. Similarly if the locking pin 30 is left in place and the locking pin 31 is removed the pin P1 acts as king pin and permits the bearing plate 25 (now locked to the bed plate 21) to swivel with respect to the truck platform 22.

It will of course be appreciated by those skilled in the art that if desired the pin P1 at one end of the vehicle may be utilized while the pin P2 is utilized at the other end. Similarly, it may be desired in some cases to provide for selectable pivoting at only one end of the vehicle.

While I have described and illustrated a preferred embodiment of my invention by way of illustration, many modifications will occur to those skilled in the art. I therefore wish to have it understood that I intend in the appended claims to cover all such modifications as fall within the true spirit and scope of my invention.

What I claim as new and desire to secure by Letters Patent of the United States is:

1. A roadway transport vehicle subject to lateral displacement of its midpoint on curved roadway sections comprising, a frame having a flat horizontal bed plate adjacent at least one end thereof, a swiveled wheel truck including a flat horizontal bolster platform supporting said one end of said frame with said bed plate overlying said frame in parallel spaced apart flatwise relation, a flat bearing plate interposed between said platform and said bed plate, separate pivotal means between said bearing plate and said bed plate and between said bearing plate and said bolster platform, said pivotal means being spaced apart longitudinally of said vehicle, and removable locking means between said bearing plate and said bed plate and between said bearing plate and said bolster platform at points radially spaced from the respective pivotal means therebetween, said locking means being selectably and only alternatively operable to prevent swiveling movement of said bearing plate about either one of said pivotal means while enabling swiveling movement about the other said pivotal means.

2. A transport vehicle according to claim 1 wherein said pivotal means lies substantially on the center line of said vehicle and the outermost pivot is positioned at substantially the longitudinal midpoint of said truck.

3. A transport vehicle according to claim 1 wherein said separate pivotal means comprise swivel pins extending vertically from opposite horixontal faces of said bearing plate and into pivot bearings in said bed plate and bolster platform respectively.

4. A transport vehicle according to claim 1 wherein said locking means comprise a removable pin adjacent each said pivotal means adapted to prevent rotation of said bearing plate about the remote pivotal means.

* * * * *